United States Patent [19]

Mallick, Jr. et al.

[11] 4,051,351
[45] Sept. 27, 1977

[54] ELECTRONIC SYSTEM FOR MONITORING PNEUMATIC TOOL PERFORMANCE

[75] Inventors: George T. Mallick, Jr.; Robert C. Miller, both of Penn Hills, Pa.

[73] Assignee: Westinghouse Electric Corporation, Pittsburgh, Pa.

[21] Appl. No.: 740,444

[22] Filed: Nov. 10, 1976

[51] Int. Cl.² .................. G06G 7/48; G01L 23/00; F15B 21/02
[52] U.S. Cl. ......................... 364/400; 73/115; 91/1; 91/35; 173/20; 340/267 R
[58] Field of Search ........... 235/151.3, 151.34, 151.13, 235/183, 151.1, 151; 340/267 R, 213 Q; 418/2, 270; 92/5 R, 261; 91/1, 35, 471, DIG. 1; 173/2, 4, 8, 9, 10, 11, 12, 20, 21, 171, 133, 206; 137/551, 553, 554, 557, 802, 624, 11, 13, 18; 73/11, 104, 112, 133, 115, 116, 168

[56] References Cited
U.S. PATENT DOCUMENTS

| | | | |
|---|---|---|---|
| 3,590,582 | 7/1971 | German et al. | 91/35 X |
| 3,664,183 | 5/1972 | Treible, Jr. | 73/133 |
| 3,699,810 | 10/1972 | Takahashi | 73/168 |
| 3,830,137 | 8/1974 | Wurth et al. | 91/1 |
| 3,930,248 | 12/1975 | Keller | 340/267 R |

*Primary Examiner*—Joseph F. Ruggiero
*Attorney, Agent, or Firm*—H. W. Patterson

[57] ABSTRACT

An electronic system to monitor the performance of a pneumatic impact forming tool is disclosed. A signal is generated in real time representing the actuating pressure of the pneumatic tool. Electronic functions operate on the real time pressure signal over a predetermined time portion of each work cycle of the pneumatic tool to generate signals representative of the energy and friction developed in the pneumatic tool during the predetermined time portions of one or more work cycles. The electronic system additionally provides a count of the number of work cycles generated by the pneumatic tool during operation thereof.

16 Claims, 12 Drawing Figures

ELECTRONIC SYSTEM FOR MONITORING PNEUMATIC TOOL PERFORMANCE

BACKGROUND OF THE INVENTION

1. Field of the Invention

The invention relates to pneumatic impact forming tools, and more particularly to the monitoring of actuating pressure therein for purposes of generating signals representative of the operating performance thereof.

2. Description of the Prior Art

In a typical pneumatic impact forming tool, pressurized gaseous fluid is delivered to a working cylinder upstream of a ram piston contained therein. The pressurized gaseous fluid generates kinetic energy by accelerating the ram piston forwardly in the working cylinder. The kinetic energy is transferred to impact energy upon contact of the ram piston with a workpiece resulting in a plastic deformation thereof. Thereafter, the ram piston is rearwardly moved in the working cylinder to restore the operating energy of the gaseous fluid and the work cycle is sequentially repeated.

A pneumatically controlled riveting gun, for example, utilizes a chisel which is coupled to the working cylinder. The ram piston located therein is accelerated by the pressurized gaseous fluid to impact the chisel which in turn plastically deforms part of a rivet impacted thereby during each work cycle until the rivet is ultimately processed to the desired form. Similarly, other pneumatically controlled tools such as forging hammers operate with the same work cycle; except in these tools, the dies used to form the workpiece are permanently attached to the ram pistons and the kinetic energy thereof is delivered directly to the workpiece.

A typical example of a pneumatic riveting gun process is in the manufacture of steam turbines wherein blades are fitted in relation to one another around their outer edge by a shroud. The shroud is fitted over the blade tenons which are then deformed by a pneumatically controlled riveting gun to form rivets holding the shroud in place. It is of particular difficulty to determine consistency in the production of each unit especially considering the varying air supply pressure due to the many other pneumatic tools operating therefrom and the dirt particles which are at times introduced into the work cylinder by means attached thereto. Presently, this difficulty is overcome by quality control methods but, in general, these methods are time consuming and costly. Another method of relieving this problem of quality inconsistency is to monitor the performance of the pneumatic tool during each operation. More specifically, it would be desirable to generate signals representative of the performance of the pneumatic tool during one or more working cycles as a function of the actuating pressure monitored therefor.

The impact energy produced by the pneumatic tool must first overcome the elastic deformation of the workpiece before said energy can plastically deform or permanently shape the workpiece. In the foregoing riveting gun example, it is important that the amount of energy delivered in each work cycle be lare enugh to cause sufficient plastic deformation of the tenon to allow completion of riveting process in as few strokes as possible. Not only will this save time and expedite the process, but it also limits the effects of any elastic wave propagation resulting from the work strokes of the pneumatic tool impacting the workpiece. These elastic waves propagating through material may cause at times weakening effects to said workpiece. Therefore, a system to generate signals representative of the energy delivered to the workpiece per one or more work cycles would be desirable. With said representative energy values, a correlation of delivered energy with rivet quality could be made available thereby providing data for calibrating a pneumatic tool to ensure deliverance of a quality amount of energy to a workpiece during day-to-day operations.

It is understood that the impact energy of a pneumatic tool must be adjusted to control the impact forming process on workpieces of varying sizes and shapes. For example, when dealing with smaller more easily formed material, the impact energy required may be less and should the pneumatic tool be incorrectly calibrated, a rapid work cycle repetition rate may result effecting an uncontrollable impact alignment on the workpiece. Here again, supplied with the energy delivered to the workpiece over one or more strokes, one may correlate said energy with both the controllability of the pneumatic tool and the quality of the workpiece formation according to size and shape. Quality reproducibility may be increased over the broad spectrum of workpieces.

Normally, pneumatic tools include automatic lubrication systems wherein the lubrication oil is permitted to flow into the work cylinder as needed by some valving arrangement. Unfortunately in some cases, the lubricating oil may erode its rubber tubing supply lines thus causing dirt particles to be introduced to the work cylinder. Other unwanted particles may be supplied at times through the air supply lines connected thereto. Foreign particles in the working cylinder will promote inefficient operation of the tool and possibly cause the tool to be shut down for repairs. It is recognized that pneumatic tools are generally very rugged, however, there have been cases when dirt particles have accumulated sufficiently in the lubricating oil supply line to clog the lubricating oil input valves whereby little to no lubrication was provided to the working cylinder. When these conditions persisted undetected for lengthy periods of time, it was observed that the barrel of the working cylinder was severely scored, at times beyond repair. It is apparent that primary emphasis should be directed to providing a system which could provide some representation of increasing frictional forces. Such a system could indicate an operational problem prior to any harmful effects caused thereby. This type of monitoring system could lead to an increase in availability and production output of said pneumatic tool.

SUMMARY OF THE INVENTION

Briefly, the system of the present invention provides calculated performance measuring parameters for a pneumatic impact forming tool. More specifically, the system provides for monitoring the actuating pressure within the working cylinder as a function of real time. Functions operate on the measured pressure signal over a portion of the work cycle time period to produce signals representative of total energy per drive stroke and virtual displacement of the drive stroke. The total energy signal is indicative of the amount of impact energy delivered to the workpiece over one or more work cycles. The virtual displacement signal is an effective measure of frictional forces occurring during said work cycles. Additionally, the invention provides a count of the number of strokes or work cycles occurring to complete each impact forming process.

DESCRIPTION OF THE PREFERRED EMBODIMENTS

1. Fundamental Principles

Figure 1:
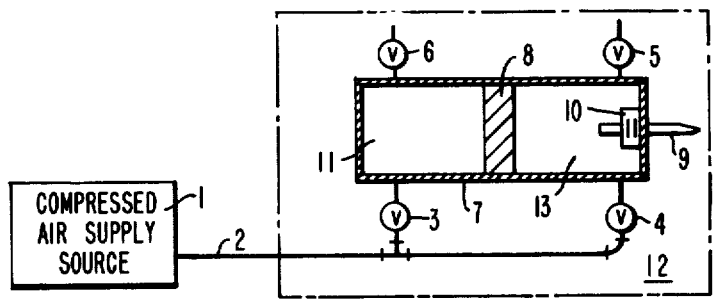
FIG. 1 shows a functional representation of a typical pneumatic tool which may be monitored by the present invention for purposes of establishing performance parameters.

A pneumatic impact forming tool is a device which converts energy stored in compressed air into impact energy for purposes of deforming a workpiece into a desired shape or form. A typical functional representation of a pneumatically operated tool is shown in FIG. 1. For purposes of description, the pneumatic tool is considered to be a riveting gun similar to that previously discussed in the background in connection with forming rivets out of turbine blade tenons to structurally attach a shroud to the turbine blades in the manufacture of steam turbines. Referring to FIG. 1, compressed air is supplied from a supply source 1 through supply line 2 to a working cylinder 7 being governed by a conventional pneumatic control valve arrangement shown functionally as valves 3 and 4. Compressed air is vented from the working cylinder 7 through a conventional vent valve arrangement shown functionally in FIG. 1 as valves 5 and 6. Within the cylinder 7 is contained a piston 8. Attached to the cylinder 7 is a "bullet tip" chisel 9 utilizing a rubber bumper means 10. That which defines a pneumatic riveting gun 12 is enclosed by the dashed lines.

Figure 2:
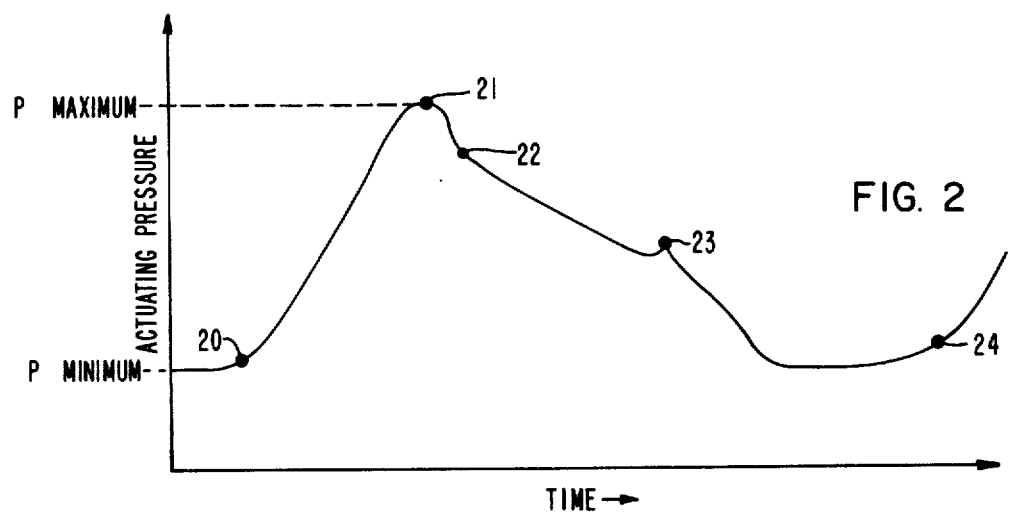
FIG. 2 illustrates a typical actuating pressure waveform monitored from a pneumatic tool similar to that of FIG. 1.

FIG. 2 illustrates the actuating pressure waveform in the cylinder portion 11 of FIG. 1 during a work cycle period. At point 20 in the waveform period, valves 4 and 6 are open and valves 3 and 5 are closed in the riveting gun 12 of FIG. 1. Under these conditions, ram piston 8 is accelerated in the direction to decrease the volume of the cylinder portion 11 and increase the cylinder portion 13. More particularly, at point 20, the vent opening of valve 6 is occluded, causing the pressure to increase in the cylinder portion 11 as the volume therein decreases. The pressure increase is shown between points 20 and 21 of the waveform in FIG. 2. At point 21, valves 3 and 5 are open and valves 4 and 6 are closed causing the ram piston 8 to move in the opposite direction. At point 22, the supply opening of valve 3 is no longer occluded by ram piston 8 and the compressed air flowing into cylinder portion 11 continues to accelerate ram piston 8 towards the chisel bit 9. At point 23, the ram piston 8 makes contact with the chisel 9. The piston 8 is then returned to its initial periodic position as shown in FIG. 2 during the time between points 23 and 24 by closing valves 3 and 5 and opening valves 4 and 6. It is understood that the precise timing of the sequential opening and closing of of valve 3, 4, 5 and 6 is very complex in reality; but the ram piston impacting the chisel with a large amount of kinetic energy remains the end result and the actuating pressure waveform as shown in FIG. 2 is typical of a work cycle period.

It has been realized that by measuring the actuating pressure in the cylinder portion 11 of riveting gun 12 as a function of time, the total energy delivered to the piston and a relative measure of frictional forces acting thereon can be determined. The preferred algorithms were derived by considering the forces acting on the ram piston 8 within the working cylinder 7 only during the time when work is done on a ram piston 8. In accordance with Newton's laws of motion, force equation (1) is established:

$$m\ddot{x} = P(t) \cdot A - f(v) \tag{1}$$

where
$\ddot{x}$ = acceleration of the ram piston 8
$m$ = mass of the ram piston 8
$A$ = cross-sectioned area of ram piston 8
$f(v)$ = frictional forces on ram piston 8 as a function of its velocity acting in opposition to motion.
$P(t)$ = pressure in work cylinder portion 11 as a function of time Integrating equation (1) and assuming zero velocity at time, $t = 0$ results in equation (2):

$$\frac{dx}{dt} = v(t) = \frac{A}{m} \int_0^t P(t')dt' - \frac{1}{m} \int_0^t f(v)dt' \tag{2}$$

where $v(t)$ is the velocity of the ram piston 8. The work done as the piston 8 is acted upon by the gas is calculated by the well known equation (3):

$$W = \int P dV \tag{3}$$

whee $dV$ is a volume element

In the working cylinder portion 11, the volume element, dV, may be represented as:

$$dV = A \cdot v(t) \cdot dt \tag{4}$$

Substituting a combination of equations (4) and (2) into equation (3) to calculate work done on the piston over the portion of the work cycle period from time, $t = 0$, to time, $t = \tau$ results in:

$$W(\tau) = \frac{A^2}{m} \int_0^\tau P(t) \int_0^t P(t')dt' \, dt \tag{5}$$

Equation (5) above assumes the frictional force contribution to total work done, $W(\tau)$, is negligible under normal operation and therefore is not used therein. It has been demonstrated by the above derivation that the total energy delivered to the piston 8 in the riveting gun 12 can be calculated utilizing the measurement of pressure during the time from 0 to $\tau$.

It is further possible to derive an equation (6) which provides a term representative of the frictional forces acting on the ram piston 8 by integrating equation (2) and assuming the distance measurement is zero at time $t = 0$:

$$\int_0^\tau v(t')dt' = L = \tag{6}$$

-continued $$\frac{4}{m} \int_o^\tau \int_o^t P(t')dt'\,dt - \frac{1}{m} \int_o^\tau \int_o^t f(v)dt'\,dt$$

where L is the actual length of the work stroke which is known. Equation (6) may be rearranged to provide a virtual displacement term, X*, which may be used to identify changes in frictional forces within the riveting gun 12, said displacement term is shown in equation (7):

$$X^* = \frac{4}{m} \int_o^\tau \int_o^t P(t')dt'\,dt = L + \frac{1}{m} \int_o^\tau \int_o^t f(v)dt'\,dt \qquad (7)$$

The virtual displacement, X*, of equation (7) contains the frictional term $$\left[ \frac{1}{m} \int_o^\tau \int_o^t f(v)dt'\,dt \right],$$

whereby any change in said frictional term will be proportionally reflected in the virtual displacement, X*. It has also been demonstrated by the above derivation that a term, X*, representative of the frictional forces acting on the piston 8 in the riveting gun 12 can be calculated utilizing the measurement of pressure of the work cylinder portion 11 during the time in the work cycle period from 0 to τ.

These parameters of energy and virtual displacement as calculated by the equations of (5) and (7) provide a measure of performance of the riveting gun 12 during its riveting process. It is understood that while the above description of operation and parameter derivation is related to a pneumatically controlled riveting gun, it may well have been conducted for other pneumatic impact forming tools such as forging hammers, for example. All such pneumatic tools operate similarly in principle; therefore, the above derivations for energy and virtual displacement may well also apply to them.

2. Functional Operation

Figure 3:
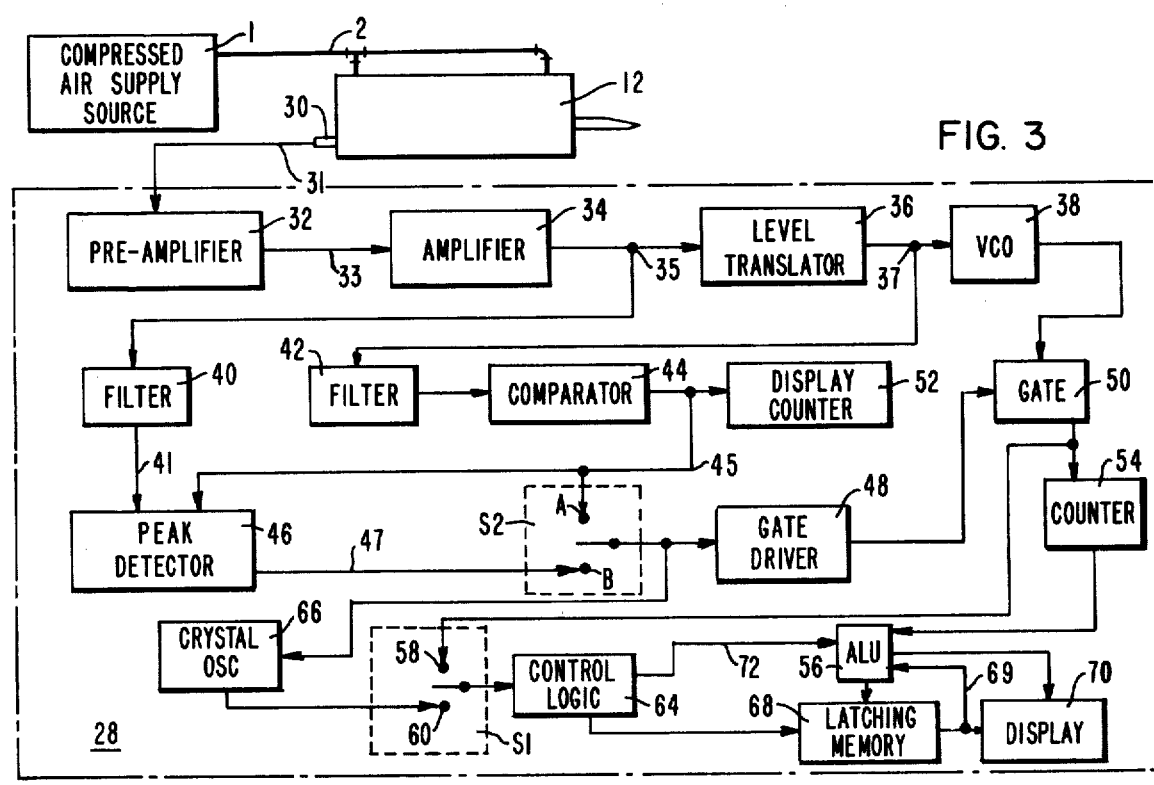
FIG. 3 shows a functional block diagram of a system according to one embodiment of the invention.

Referring to FIG. 3, the compressed air supply source 1 supplies compressed air within supply line 2 to a pneumatic impact tool 12. The pneumatic tool 12 may be a riveting gun similar to the type manufactured by Thor named "Rivet Buster", Model No. 983. The actuating pressure in the cylinder portion 11 (refer to FIG. 1) of the pneumatic tool 12 is monitored by a pressure transducer 30 attached thereto. The pressure transducer 30 may be similar to a Bell and Howell bonded strain gauge transducer, Model 402. The pressure transducer signal 31 is coupled to a preamplifier 32 in a performance measuring system 28. The preamplifier 32 may be of the type manufactured by Westinghouse Electric Corporation, Model No. 100 strain gauge amplifier. The output of the pre-amplifier 32 is coupled to an amplifier 34 wherein a convenient gain is adjusted. The output signal 35 is conditioned by level translator 36 to permit cooperation of its output 37 with the voltage controlled oscillator (VCO) 38. The VCO 38 produces an output pulse rate proportional to the voltage magnitude of the input pressure signal 31.

The amplified pressure signal 35 is filtered by a filter 40 to remove any high frequency noise and coupled to a peak detector 46. The level translated signal 37 is also filtered by filter 42 to remove high frequency noise and coupled to comparator 44 wherein it is compared with a predetermined reference signal which is generally set slightly below the scaled actuating pressure signal value corresponding to piston impact with chisel (point 23 in FIG. 2). The output signal 45 of comparator 44 responds positively when the pressure signal 37 is greater than the predetermined reference signal thereby producing a pulse during each work cycle period of the pneumatic tool 12. These pulses are provided to a display counter 52 similar to a Hewlett Packard Model 5245L wherein the pulses are accumulated. An indication of the number of work cycles used to complete an impact forming operation is displayed by the counter 52. The output signal 45 is also provided to position A of switch S2 to control gate driver 48 when switch S2 is in position A.

The peak detector 46 utilizes amplified pressure signal 41 and comparator output signal 45 to define a time period 0 to τ during each work cycle wherein integration operations may be performed. This time period approximates the time during which the gas acts on the piston to develop energy in each work cycle. A more detailed description of the peak detector function will be provided hereinbelow. The output signal 47 of peak detector 46 is provided to position B of switch S2 to control gate driver 48 when switch S2 is in position B.

The gate driver 48 responds to either the signal 47 or the signal 45, depending on the selection of positions B or A of switch S2, to close gate function 50 which permits pulses generated from VCO 38 to accumulate in a counter 54 during a time period 0 to τ as defined by either the peak detector 46 or the comparator 44. The total count, N(τ), in the counter 54 accumulated over the time period 0 to τ approximates the integral $$\int_o^\tau P(t')dt'.$$

It is understood that the time period 0 to τ may either be determined by the peak detector 46 of the comparator 44. It is the purpose of the remaining functions of FIG. 3 to calculate the integrals for energy and virtual displacement as derived above in equations (5) and (7), respectively.

As was previously described, the output frequency F(t), of the VCO 38 is proportional to the actuating pressure, P(t). Using a convenient scaling actor, α, the following equation holds true:

$$F(t) = \alpha \cdot P(t) \qquad (8)$$

where a value for α may be 2.48 × 10³ Hz/40 psi which was found to be suitable for this embodiment.

It has also been determined from the above functional description that:

$$N(\tau) = \frac{1}{\alpha} \int_o^\tau F(t)dt \qquad (9)$$

Then, by substituting equations (8) and (9) into equation (5), equation (10) is established:

$$W = \frac{mW(\tau)}{A^2} = \frac{1}{a^2} \int_0^\tau F(t) \cdot N(t') \cdot dt \quad (10)$$

were $N(t')$ is the accumulated count in counter 54 during the time period 0 to $\tau$ at time, $t'$.

The result of equation (10) may be approximated by the sum of terms shown in equation (11).

$$\Delta W \approx \sum_{i=1}^{M} F(t_i) \cdot N(t_i) \cdot \Delta t_i \quad (11)$$

where $\Delta t_i$ = intervals during the time period 0 to $\tau$.

$M \cdot \Delta t_i$ = the total time period 0 to $\tau$ wherein there are M time intervals.

$N(t_i)$ = the accumulated count in counter 54 at time interval $\tau t_i$.

It is also clear that the term $\Delta t_i \cdot t_i$.

It is also clear that the term $\Delta t_i \cdot F(t_i)$ is the number of pulses produced by VCO 38 over the time interval $\Delta t_i$ which may be represented by $N_2(t_i)$ such that:

$$N_2(t_i) = \Delta t_i \cdot F(t_i) \quad (12)$$

Further, if $N(t_i)$ is added into a counter $N_2(t_i)$ times in an interval of time $\Delta t_i$, the multiplication of the terms $F(t_i) \cdot N(t_i) \cdot \Delta t_i$ is accomplished. Carrying out this operation M times and summing the results yields an approximation (equation 11 above) of the required integral shown in equation (10) neglecting the scaling factors.

In the embodiment which is described in connection with FIG. 3, it is convenient to subdivide the time interval $\Delta t_i$ into many smaller intervals each being one pulse of the VCO 38 output. Referring to FIG. 3 then, if switch S1 is in switch position 58, the control logic function 64 coordinates the operation of the arithmetic logic unit (ALU) 56 and latching memory 68 to accumulate the counts $N(t_i)$ of the counter 54, in the ALU 56 for each pulse generated by the VCO 38. The occurrence of additions will be $\Delta t_i \cdot F(t_i)$ in each time interval $\Delta t_i$. Therefore, at the end of the first time interval, $\Delta t_i$, the resulting total count in the ALU 56 is equal to $F(t_1) \cdot N(t_1) \cdot \Delta t_1$. Totalizing continues for M time intervals, $\Delta t_i$, to compute the approximated enegy integral in equation (11). It is possible with this embodiment to accumulate calculated energies resulting from more than one work cycle. The calculated results of energy developed in the work cyclinder of pneumatic tool 12 for one or more work cycles is displayed in display 70. A more detailed description of the coordinated generation of the control logic 64, ALU 56 and latching memory 68 will be provided hereinbelow.

To evaluate the virtual displacement integral of equation (7), it is possible to approximate the double integration with the following equation:

$$X^* = \frac{1}{a} \sum_{i=1}^{N_c} N(t_i) \cdot \frac{1}{f_c} \quad (13)$$

where $f_c$ is a constant rate dividing the time period 0 to $\tau$ into $N_c$ time intervals;

$N(t_i)$ is the contents of the counter 54 at the ith time interval of the $N_c$ time intervals.

Referring to FIG. 3 again, if switch S1 is in switch position 60, the control logic function 64 coordinates the operation of the ALU 56 and latching memory 68 to accumulate the counts $N(t_i)$ for each fixed time interval, $\Delta t_i$, as defined by the rate, $f_c$, of the crystal oscillator 66. The output signal 47 of the peak detector 46 initiates and terminates the pulse rate, $f_c$, generated by the crystal oscillator 66 to switch S1 position 60. A suitable transfer rate, $f_c$, may be 6250 Hz for this embodiment which is high enough to permit adequate resolution of the function shown in equation (13). It is also clear in connection with equation (13) that the frequency rate, $f_c$, alters the scaling factor, $a$. A more detailed description will be provided in the specific circuit description below. It is understood that the approximations used above in equations (11) and (13) will involve errors in the final computed value, however, since the measured actuating pressure varies slowly with respect to the rate of additions, these errors are less than one percent.

3. Specific Circuitry

Figure 4:
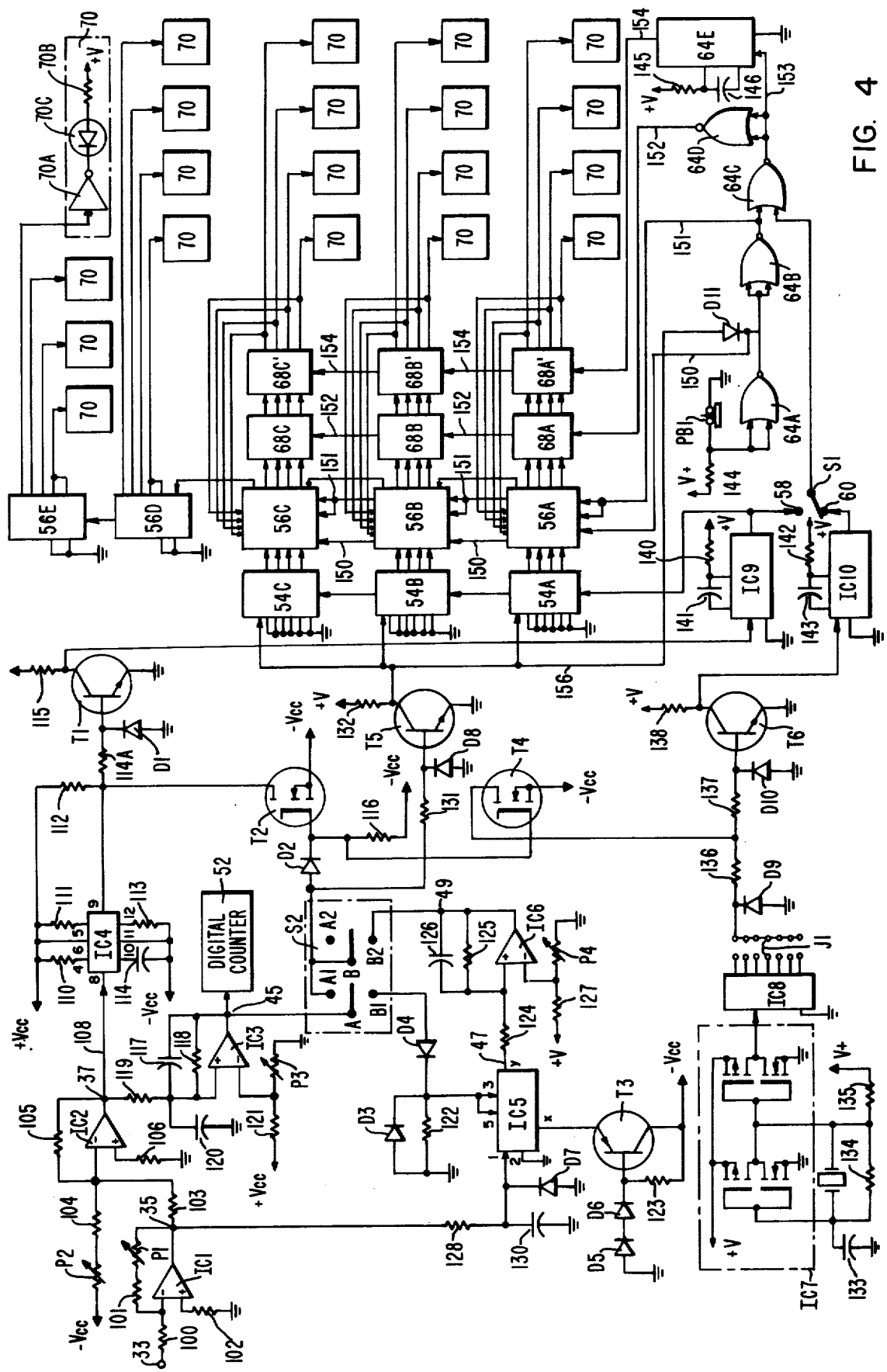
FIG. 4 is a schematic circuit diagram of the embodiment of the invention of FIG. 3.
Figure 5A:
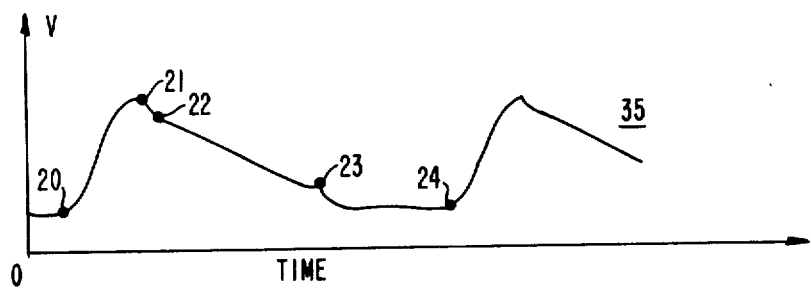
FIGS. 5A through 5H are waveforms illustrating the operation of the circuit schematic of FIG. 4.
Figure 5B:
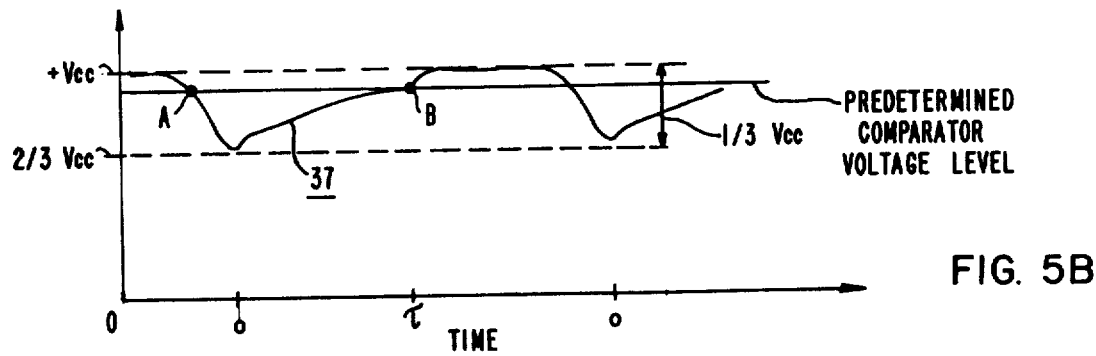

Referring to FIG. 4, the pressure signal 33, output of pre-amplifier 32, is the output to a conventional inverting amplifier configuration comprising an operational amplifier IC1, resistors 100, 101 and 102, and potentiometer P1. The potentiometer P1 adjusts the closed-loop gain of the amplifier configuration. A typical waveform of the output signal 35 is shown in FIG. 5A. The output 35 is connected to a conventional summing amplifier configuration through resistor 103. Also connected to the same summing amplifier configuration through the series combination of potentiometer P2 and resistor 104 is a negative voltage reference potential $-V_{cc}$ wherein $-10V$ may be used for this embodiment. Resistor 105 sets the closed-loop gain around operational amplifier IC2 while resistor 106 sets the potential of the non-inverting input summing junction of IC2. A typical waveform of the output signal 37 is shown in FIG. 5B. Potentiometer P2 adjusts an offset potential level of the output signal 37. The reason for the adjustment will become obvious in the following description of a VCO circuit.

The integrated circuit IC4 which is similar to that manufactured by Intersil, Inc., Model No. 8038 "Waveform Generator", is configured utilizing resistors 110, 111, 112 and 113, and capacitor 114 to perform a voltage controlled oscillation (VCO) function. The VCO configuration is powered by $+V_{cc}$ and $-V_{cc}$ regulated supplies. The duty cycle and frequency are set by resistors 110, 111 and capacitor 114. A current bias is set by resistor 113 and resistor 112 is used for "pull-up". The frequency of IC4 is a direct function of the signal 37 connected at terminal 8 wherein this potential may be swept from $+V_{cc}$ to $\frac{1}{3} V_{cc}$ (refer to FIG. 5B) corresponding to zero to full scale frequency, respectively. A suitable frequency range for this embodiment may be 3000 Hz with an equal duty cycle pulse rate waveform. One possible scaling adjustment may be that of adjusting potentiometer P2 in the previously described summing amplifier such that a voltage potential of $V_{cc}$ of signal 37 is approximately equal to the lowest pressure signal 31 encountered during a work cycle period (i.e. zero frequency of IC4 corresponds to minimum pressure signal 31, refer to FIG. 3). The pulse rate modulated waveform of IC4 is buffered by an inverting switching circuit comprising resistors 114A, 115, transistor T1 and diode D1. The voltage at the collector of transistor T1 responds to the pulsed signal 37 in the conventional inverting manner. A monostable multivibrator circuit, comprising IC9, resistor 140 and capacitor 141, is connected to the collector of T1 to provide a well defined pulse width (typically set at 10μ sec.) upon detection of a rising edge of each pulse produced by the transistor T1. The monostable multivibrator IC9 may be of the type manufactured by Texas Instruments, Inc., Model No. 74123. The output of IC9 which is the pulse rate modulated waveform of well defined pulse widths proportonal to the actuating pressure of the pneumatic tool 12 is accumulated at times in a cascaded set of three binary counters 54A, 54B and 54C and is also attached to position 58 of a single-pole-double-throw (SPDT) switch S1. The binary counters may be of the type manufactured by Texas Instruments, Inc., Model No. 74191.

Figure 5C:
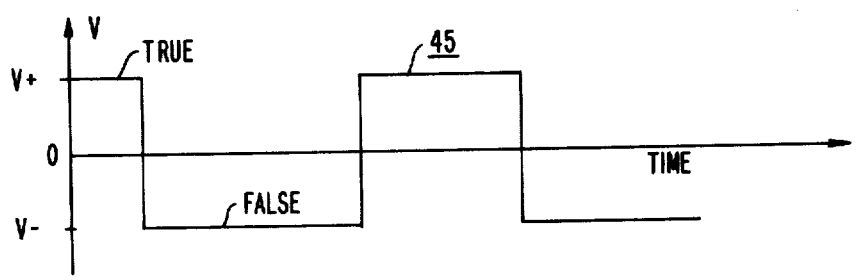

Signal 37, the output of operational amplifier IC2, is coupled to a comparator circuit comprising operational amplifier IC3, resistors 119, 118. A voltage level is established at the connection of resistor 121 and potentiometer P3 by adjusting potentiometer P3. This voltage level is provided to the non-inverting (−) input of IC3 to be compared with signal 37. Capacitors C120 and C117 are incorporated to provide double-pole filtering. When signal 37 falls below the voltage level supplied to the (−) input of IC3, the output of IC3 saturates negatively and likewise, when signal 37 is above the voltage level established at the (−) input of IC3, the output of IC3 saturates positively. A typical resulting waveform is shown in FIG. 5C. Pulses produced by IC3 are each indicative of a complete work cycle of pneumatic tool 12. The signal 45 is coupled to a digital counter 52 for purposes of counting the work cycles during a workpiece forming operation and also coupled to pole A of switch S2.

Signal 35, the output of operational amplifier IC1, is filtered to reduce high frequency noise by a network resistor 128 and capacitor 130. A Zener diode D7 is provided to protect against overvoltage. The voltage potential of capacitor 130 is supplied to peak detector IC5. The peak detector IC5 may be typical of that manufactured by Burr-Brown, Model No. 4084/25. A bias current drain from IC5 to the negative regulated voltage potential $-V_\alpha$ is established by the circuit configuration comprising diodes D5, D6, transistor T3 and resistor 123. A reset signal 45, the output of comparator IC3, is provided to peak detector IC5 for purposes of mode control when DPDT switch S2 is in positions B1, B2. The diodes D3 and D4 and resistor 122 are included to clamp signal 45 and protect mode control input terminals 3 and 5 of IC5. A logically true signal at terminals 3 and 5 of IC5 inhibits the peak detection operation from occurring therein. When signal 45 is logically false (refer to FIG. 5C), the peak detection operation of IC5 is permitted. A typical peak detection operation for the times when DPDT switch S2 is in positions B1, B2 is illustrated in FIGS. 5A through 5D. Assuming that a work cycle of pneumatic tool 12 begins at point 20, pressure increases in the work cylinder as the piston is returned to its starting position as previously described. When the pressure signal 37 reaches point A in FIG. 5B, the comparator output of IC3 changes state from logically true to logically false (see FIG. 5C). Signal 45, which is supplied to peak detector IC5, enables the peak detection operation therein to occur. The peak detector IC5 internally tracks the filtered signal 35 until it detects a maximum such as that shown at point 21 in FIG. 5A, during which time its output at terminal 4, signal 47, is logically true. At the time of peak detection, signal 47 switches to a logical false state and remains false until the reset signal 45 becomes true as a result of the pressure signal 37 falling below the predetermined comparator level (see point B, FIG. 5B). Thus, a period of time from 0 to τ is established during each working cycle of the pneumatic tool 12. This time interval 0 to τ may just as well been established by the comparator 44 at times when switch S2 is in position A1, A2 under these conditions, the time interval 0 to τ is defined by the time over which signal 45 remains false (refer to FIG. 5C). In either case, this time duration is indicative of the time over which energy is developed in the ram piston. Ideally, the kinetic energy developed in the ram piston is converted to impact energy used to form the desired shape of a workpiece.

A constant pulse rate waveform is generated by the circuitry surrounding a crystal XI comprising resistors 134 and 135, capacitor 133 and complementary metal oxide semiconductor inverter package IC7 (typically an RCA COS/MOS CD4007 may be used). Resistors 134 and 135 establish the excitation potential across the crystal XI using supply voltage V+ and capacitor 133 is provided to filter possible higher order harmonic excitations of the crystal X1. One inverter of packet IC7 is connected across crystal X1 to amplify the frequency generated by the crystal configuration. A second inverter of the package IC7 is connected to both the crystal X1 and the first inverter to buffer the amplified pulse rate signal generated by the first inverter. The buffered fixed pulse rate signal (typically 100 kilohertz) is coupled to a binary counter IC8 similar to the type manufactured by RCA, Model CD4024 wherein the fixed pulse rate is divided through seven binary stages. One of the resulting seven outputs of IC8 is jumpered, J1, to a conventional inverter buffer circuit comprising resistors 136 and 137 in series, resistor 138, transistor T6 and diode D10. A suitable pulse rate which may be jumpered for this embodiment is 6.24 kilohertz (KHz). Attached to the connection point of resistors 136 and 137 is a metal oxide semiconductor (MOS) field effect transistor (FET) T4 which when conducting inhibits the fixed pulse rate of IC8 from operating the inverter circuit of transistor T6. The additional diode D9 protects the jumpered output of IC8 when FET T4 is conducting. The collector of T6 is connected to another monostable multivibrator IC10, similar to IC9, which forms constant width pulses in response to the rising edge of each pulse generated from T6. Resistor 142 and capacitor 143 establish the fixed pulse width generated by the monostable IC10 (typically 10 microseconds, μsec.). The constant fixed pulse width train of IC10 is coupled to position 60 of the SPDT switch S1.

Figure 5D:
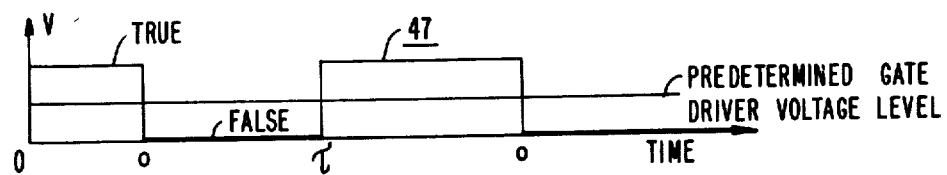

Assuming the case in which DPDT switch S2 is in positions B1, B2, then signal 47 is used to define the calculating period O to τ during each work cycle. Signal 47, then enables and inhibits the pulses generated by the VCO IC4 and crystal oscillator output IC8 from effecting downstream circuitry by driving gates T2 and T4 into conduction with a gate driver circuit comprising an operational amplifier IC6, resistors 124 and 125 and capacitor 126. Resistor 127 and potentiometer P4 establish a voltage level at their connection which is provided to the (−) input of IC6. Each time the singal 47 changes state as shown in FIG. 5D, the output of IC6 will also change state, accordingly. Amplifier IC6 repsonds to signal 47 by saturating positively when signal 47 is logically true and negatively when 47 is false.

It is also apparent that the output signal 45 of comparator 44 may also be selected to enable and inhibit the pulses generated by the VCO IC4 and crystal oscillator output IC8 by switching S2 to positions A1, A2. In either case, the pole position B of S2 is coupled to enhancement mode MOS FETS T2 and T4 such that when either signal 49 or 45, as selectively by switch S2, saturates positively, the voltage potential is made conveniently sufficient to force T2 and T4 through diode D2 to both conduct thereby inhibiting the pulse rates of IC4 and IC8 from effecting the downstream circuitry. Also, when either signal 49 or 45 saturates negatively defining calculating period O to $\tau$ the diode D2 is not forward biased and resistor 116 brings the gates of MOS FET T2 and T4 to a negative supply potential V− thereby "pinching" off any current flow conducted therethrough. During this time period O to $\tau$ of each working cycle, the pulse rates of IC4 and IC8 are permitted to effect downstream circuitry. Also attached to the pole position B of swirch S2 is a conventional buffer inverter switching circuit comprising resistors 131 and 132, diode D8 and transistor T5. The collector of T5 is provided to each of the binary counters 54A, 54B and 54C to hold the counters 54A, 54B and 54C at a zero count during times outside the calculating time period O to $\tau$ and permitting counters to accumulate the pulses from monostable IC9 during the time O to $\tau$. The accumulated pulse count in the counters 54A, 54B and 54C during the time O to $\tau$ is representative of the time integral of the pressure signal 31 as shown in equation (9) above. The collector signal of T5 is also coupled to a nor gate 64B through diode D11 of which a description will be provided hereinbelow.

Arithmethic logic unit (ALU) packages 56A, 56B, and 56C similar to those manufactured by Texas Instruments, Inc., Model No. 74181, are connected in cascade to perform a 12 bit binary parallel full addition function. One 12 bit binary number is supplied to ALU's 56A, B and C in parallel format from counters 54A, 54B and 54C and the other 12 bit binary number is supplied to the ALU's 56A, B and C in parallel format from a set of three 4-bit latching memory integrated circuits 68A', 68B', 68C'. The summation result of the two 12-bit binary numbers from the ALU's 56A, B and C is provided to another set of three 4-bit latching memory integrated circuits 68A, 68B, and 68C. The 4-bit memory chips may be of the type manufactured by Texas Instruments, Inc., Model No. 74100. The outputs of latching memories 68A, 68B, and 68C are connected to the data inputs of latching memories 68A', 68B' and 68C', respectively. All addition overflows of the ALU functions 56A, 56B, and 56C are accumulated in the counters 56D and 56E which are an extension of the summation result. A light emitting diode (LED) buffered display output is connected to each of the binary bit outputs of the latching memories 68A', 68B' and 68C' and the counters 56D and 56E. A typical circuit arrangement is shown by inverter 70A, LED 70C and current limiting resistor 70B. The LED display represents the approximations of equation (11) or (13) shown above for one or more work cycles.

Control of the ALU's 56A, 56B and 56C double-buffered doublebuffered latching memories 68A, 68B and 68C, and 68A', 68B', 68C' is performed by the circuit arrangement of NOR gates 64A. 64B, 64C and 64D and monostable multivibrator 64E. The pushbutton PB1 operates to accomplish an initialization of the calculation circuitry by open circuiting the connection of the input to 64A to ground whereby a positive voltage potential V+ is applied to the input of 64A through resistor 144 effecting the output of 64A to a low potential and causing the counters 54A, 54B and 54C to be initialized through diode D11 over control line 156. NOR gates 64B, 64C and 64D and monostable 64E respond accordingly to low potential at the output of 64A to effect an initialization of the ALU's 56A, 56B and 56C using mode control lines 150 and 151, the latches 68A, 68B and 68C, using latch enable 152, and the latches 68A', 68B' and 68C' using latch enable 154. During a calculation of energy or virtual displacement, equations (11) and (13) respectively, PB1 will be closed to ground causing the output of 64A (control line 150) to be maintained at approximately V+ potential. At the end of each calculation period, O to $\tau$, the counters 54A, 54B and 54C are reset to all zero's by the collector signal of transistor T5 (control line 156), but because of the reverse bias condition of diode D11 at this time, the control lines 150, 151, 152 and 153 remained unchanged. In this manner, calculations for more than one work cycle may be accumulated.

Assuming the case when switch S2 is in positions B1, B2 then to effect the energy calculation of equation (11) above, switch S1 is placed in the position 58. When the actuating pressure reaches a maximum (refer to point 21, FIG. 5A), it is assumed that the ram piston in the working cylinder (see FIG. 1, for example), is at zero kinetic energy. Signal 47, initiates the calculation period, O to $\tau$, by indicating a peak of pressure signal 35 has occurred. Control line 156 becomes logically true permitting pulses to begin accumulating in counters 54A, 54B, and 54C. Each fixed width pulse conducted through S1 from IC9 to NOR gate 64C causes the output of 64C, signal line 153, to become logically false for the fixed width pulse time (typically 10 $\mu$sec.) and then logically true. Concurrently, the output of 64D, will gate the addition result of the ALU's 56A, 56B and 56C into latching memories 68A, 68B and 68C, respectively. Monostable 64E responds to the rising edge of signal 153 to produce a gating pulse (typically 5$\mu$sec.) to transfer the most recently captured data (i.e. the results of the previous addition) from latching memories 68A, 68B and 68C to latching memories 68A', 68B' and 68C', respectively (refer to FIGS. 5E and 5F). Therefore, the accumulated results of one addition corresponding to a pulse of the output of IC9 will be added to the next binary count of the counters 54A, 54B and 54C.

Figure 5E:
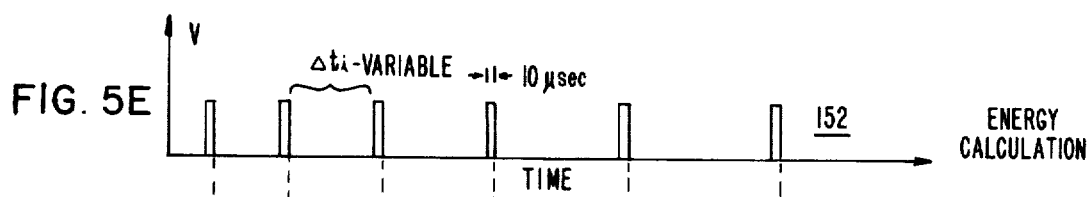
Figure 5F:
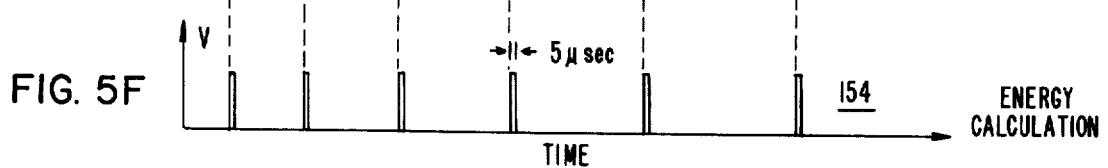

As an example of operation, after initialization, assuming that all calculation registers are zero, the first pulse received by counters 54A. 54B and 54C will be added to the output of latches 68A', 68B' and 68C', utilizing ALU's 56A. 56B and 56C, respectively. During the fixed pulse width, the output of the ALU's, namely binary one, will be gated in memory 68A, 68B and 68C by signal 152. At the end of the first fixed pulse width as shown in FIGS. 5E and 5F, a second gating signal 154 is generated by monostable 64E to capture the binary one of latches 68A, B and C in latches 68A', B' and C', respectively. During the second fixed width pulse from IC9, the count of binary two accumulated in the counters 54A, B and C is added to the previous addition result of binary one, maintained in latches 68A', B' and C', using ALU's 56A, B and C, respectively. The summation, binary three, is captured by latches 68A, B and C during the second fixed width pulse and then, captured by latches 68A', B' and C' at the end of the second fixed width pulse by the pulse generated over control line 154 by monostable 64E. This summation operation is sequentially repeated with each occurrence of a fixed width pulse from IC9 resulting in subsequent additions of 3, 6, 10, 15, 21, ... etc. Now, it is apparent that each fixed pulse width generated by IC9 is equal to the term, $F(t_i) \cdot \Delta t_i$, if the time interval, $\Delta t_i$ is considered variable and only including one pulse. And if the content of the counters 54A. B, and C, $N(t_i)$, is accumulatd for each of M time intervals, $\Delta t_i$, generated by VCO IC4 over time period O to $\tau$, then it is shown that the previously described circuitry of FIG. 4 produces the result of equation (11) above. It is also apparent that energies developed over one or more work cycles are calculated and accumulated in the registers 68A', B' and C' and 56D and E. The energy representations for one or more work cycles are observed through the LED displays. After reading the LED displays, the calculation registers are re-initialized for the next calculations by depressing pushbutton PB1.

Figure 5G:
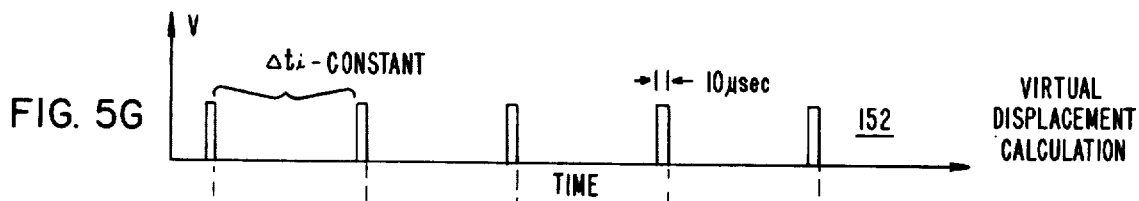
Figure 5H:
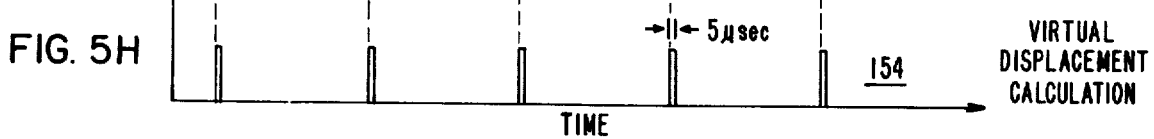

The virtual displacement calculation of equation (13) above, is effected in a similar operation as that just described with the exception of switch S1 being in the position 60. Under these conditions, repetitive summations are controlled at a constant rate by fixed width pulses generated by IC10 (refer to FIG. 5G) instead of the variable rate proportional to the pressure signal 31, as generated by IC9 (refer to FIG. 5E). The content of counters 54A, B and C, $N(t_i)$, is accumulated for each of the M time intervals, $\Delta t_i$, at a constant rate as determined by the crystal oscillator 66 previously described, thereby performing the calculation of equation (13). The virtual displacement representations for one or more work cycles are observed through the LED displays. R-initialization is preformed as described above by depressing pushbutton PB1. The operations in both the calculations of energy and virtual displacement as previously described may have been performed with switch S2 in positions A1, A2. In this case, all operations are similar except that the time period O to $\tau$ is now defined as the time over which signal 45 (refer to FIG. 5C) is false.

It is understod that the embodiment was presented hereinabove to provide an illustrative understanding of the principles of the invention. It is further understood that the calculation of the performance parameters of energy and virtual displacement may also be performed using analog integrators or a programmed central processor, such as a microprocessor, without deviating from the invention principles. It is desired that the invention not be limited by this embodiment but allowed an interpretation on its broad scope.

We claim:

1. An electronic system for generating signals representative of the performance of a pneumatic tool during one or more work cycles wherein said pneumatic tool includes a working cylinder and gaseous actuating fluid contained therein, said electronic system comprising:
   means to generate a signal in real time representative of the actuating gaseous fluid pressure in the work cylinder of said pneumatic tool;
   first means to operate at times on said real time pressure signal only over a selected time portion of each of said work cycles for generating a signal representative of the energy developed in said pneumatic tool during said time portions; and
   second means to operate at times on said real time pressure signal only over a selected time portion of each of said work cycles for generating a signal representative of the friction developed in said pneumatic tool during said time portions.

2. An electronic system according to claim 1 wherein said selected time portions of both the first and second operating means are initiated at a time when the real time pressure signal attains a peak amplitude and terminated sequentially thereafter at a time when the real time pressure signal attains an amplitude less than a predetermined value.

3. An electronic system according to claim 1 including a means to generate a signal representative of the number of work cycles performed in the functioning of the pneumatic tool.

4. An electronic system according to claim 1 wherein the first means generates the representative energy signal for each work cycle in accordance with an approximation of the double integral equation, $$\int_0^\tau P(t) \int_0^t P(t') \, dt' \, dt,$$

in which P(t) andd P(t') denote the real time pressure signal and the integration time O to $\tau$ is the selected time portion during each of the work cycles.

5. An electronic system according to claim 1 wherein the second means generates the representative friction signal for each work cycle in accordance with an approximation of the double integral equation, $$\int_0^\tau \int_0^t P(t') \, dt' \, dt,$$

in which P(t') denotes the real time pressure signal and the integration time O to $\tau$ is the selected time portion during each of the work cycles.

6. An electronic system according to claim 1 further including a switching means for selecting operation of one of the first and second means for generating one of the representative energy and representative friction signals, respectively.

7. An electronic system for monitoring the performance of a pneumatic tool, said electronic system comprising:
   means to generate in real time a signal representative of the actuating gaseous fluid pressure in said pneumatic tool;
   first means goverend by said pressure signal to generate a train of pulses with a pulse rate correspondingly proportional in time to the magnitude of said real time pressure signal;
   second means governed by the magnitude of said pressure signal to generate a time duration pulse during each work cycle of said pneumatic tool;
   a counter governed by said time duration pulse signal to generate consecutive counts wherein each consecutive count corresponds to a pulse of said pulse train generated by said first means;
   third means to generate a train of pulses with a predetermined constant pulse rate; and
   an accumulator governed by a selected one of said first and third means to accumulate only those counts generated by said counter which are concurrent with the pulses generated by the selected one of said first and third means during said time duration pulse wherein the count accumulation in said accumulator is representative of the performance of said pneumatic tool.

8. An electronic system according to claim 7 wherein the counter is maintained at a zero count at times outside the time duration pulse, said counter being enabled to generate counts at the start of the time duration pulse.

9. An electronic system according to claim 8 wherein the generated count, $N(t_i)$, of the counter corresponding to the ith pulse of the pulse train generated by the first means during each time duration pulse approximates the integral, $$\int_o^{t_i} P(t)\, dt,$$

in which $P(t)$ denotes the real time signal representative of the actuating pressure and $t_i$ denotes the time over which $i$ pulses have been generated by the first means starting from the beginning of the time duration pulse.

10. An electronic system according to claim 7 wherein the second means starts the time duration pulse at a time when the actuating pressure signal attains a peak magnitude and sequentially thereafter terminates the time duration pulse at a time when the actuating pressure attains a magnitude below a predetermined value during each work, cycle, whereby the time duration pulse approximates the time interval over which energy is developed in the pneumatic tool during each work cycle thereof.

11. An electronic system according to claim 7 wherein when the first means is selected to govern the accumulator, the accumulation of counts at the end of each time duration pulse is representative of the summation, $$\sum_{i=1}^{M} [F(t_i) \cdot \Delta t_i] \cdot N(t_i)$$

in which $N(t_i)$ denotes the count in the counter corresponding to the ith pulse generated by the first means during the time duration pulse, the term $[F(t_i) \cdot \Delta t_i]$ denotes the time interval between the $(i-1)$ and $i$th additions which is a function of the real time pressure signal and M denotes the total number of pulses generated by the first means during the time duration pulse.

12. An electronic system according to claim 11 wherein the summation of claim 11, $$\sum_{i=1}^{M} [F(t_i) \cdot \Delta t_i] \cdot N(t_i),$$

is representative of the energy developed in the pneumatic tool during the time duration pulse of each work cycle.

13. An electronic system according to claim 7 wherein when the third means is selected to govern the accumulator, the accumulation of counts at the end of each time duration pulse is representative of the summation, $$\sum_{i=1}^{N_c} N(t_i) \cdot \frac{1}{f_c},$$

in which $f_c$ denotes the predetermined constant pulse rate of the third means, $n(t_i)$ denotes the count in the counter at the ith pulse generated by the third means during the time duration pulse, $(1/f_c)$ denotes a constant time interval between additions and $N_c$ denotes the total number of pulses generated by the third means during the time duration pulse.

14. An electronic system according to claim 13 wherein the summation of claim 13, $$\sum_{i=1}^{N_c} N(t_i) \cdot \frac{1}{f_c},$$

is an indication of the friction developed in the pneumatic tool during the time duration pulse of each work cycle.

15. An electronic system according to claim 7 including a means to count the number of work cycles generated by the pneumatic tool during a monitoring operation.

16. An electronic system according to claim 7 wherein the accumulator includes means to permit accumulation of counts generated by the counter during the time duration pulses of one or more work cycles of the pneumatic tool.

* * * * *